US009787812B2

(12) United States Patent
Feit et al.

(10) Patent No.: US 9,787,812 B2
(45) Date of Patent: Oct. 10, 2017

(54) PRIVACY MANAGEMENT

(71) Applicant: Honda Motor Co., Ltd., Tokyo (JP)

(72) Inventors: Steven Feit, Dublin, OH (US); Ross Miller, Hilliard, OH (US); Michael Smith, Seattle, WA (US); Matt Conway, Seattle, WA (US); Sophie Milton, Mukilteo, WA (US); Churu Yun, Seattle, WA (US)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 14/687,252

(22) Filed: Apr. 15, 2015

(65) Prior Publication Data

US 2016/0059864 A1    Mar. 3, 2016

Related U.S. Application Data

(60) Provisional application No. 62/043,111, filed on Aug. 28, 2014.

(51) Int. Cl.
| *G06F 7/00* | (2006.01) |
| *H04M 1/60* | (2006.01) |
| *B60K 35/00* | (2006.01) |
| *H04M 1/725* | (2006.01) |
| *G10L 15/00* | (2013.01) |
| *G10L 15/26* | (2006.01) |
| *G06F 9/44* | (2006.01) |
| *G06N 7/02* | (2006.01) |
| *G06N 7/06* | (2006.01) |

(52) U.S. Cl.
CPC ........... *H04M 1/6075* (2013.01); *B60K 35/00* (2013.01); *H04M 1/72569* (2013.01)

(58) Field of Classification Search
CPC ............ H04M 1/6075; H04M 1/72569; B60K 35/00; G06F 15/16; G06F 7/00
USPC ............................... 701/36; 704/235; 706/52
See application file for complete search history.

(56) References Cited

U.S. PATENT DOCUMENTS

| 5,812,128 A | 9/1998 | Sterling, IV |
| 7,509,588 B2 | 3/2009 | Van Os et al. |
| 8,091,045 B2 | 1/2012 | Christie et al. |
| 8,201,109 B2 | 6/2012 | Van Os et al. |
| 8,344,870 B2 | 1/2013 | Evans et al. |
| 8,375,336 B2 | 2/2013 | Matthews et al. |
| 8,619,038 B2 | 12/2013 | Chaudhri et al. |
| 8,689,132 B2 | 4/2014 | Lamiraux et al. |

(Continued)

*Primary Examiner* — Mahmoud Ismail
(74) *Attorney, Agent, or Firm* — Rankin, Hill & Clark LLP

(57) ABSTRACT

One or more embodiments of techniques or systems for privacy management are provided herein. In one or more embodiments, privacy management may be provided by adjusting the way a system provides notifications, handles communications, or executes applications based on the presence or positioning of one or more occupants within a vehicle. In other words, a vehicle may provide notifications in a first manner when merely a driver is present but provide notifications in a second manner (e.g., different than the first manner) when an additional occupant is detected. Sensors may be utilized to detect the presence or positioning of occupants and communications or applications may be managed accordingly. In this manner, privacy management is provided, thus enhancing security of applications or communications utilized by occupants of a vehicle, such as a driver, for example.

19 Claims, 6 Drawing Sheets

(56) References Cited

U.S. PATENT DOCUMENTS

| | | |
|---|---|---|
| 2009/0138827 A1 | 5/2009 | Van Os et al. |
| 2010/0070931 A1 | 3/2010 | Nichols |
| 2011/0061010 A1 | 3/2011 | Wasko |
| 2011/0072492 A1 | 3/2011 | Mohler et al. |
| 2011/0202853 A1 | 8/2011 | Mujkic |
| 2011/0209080 A1 | 8/2011 | Bamford et al. |
| 2011/0216095 A1 | 9/2011 | Rydenhag |
| 2011/0271179 A1 | 11/2011 | Jasko et al. |
| 2012/0035923 A1* | 2/2012 | Krause .................... H04W 4/18 704/235 |
| 2012/0052933 A1 | 3/2012 | Olson et al. |
| 2012/0185789 A1 | 7/2012 | Louch |
| 2012/0254795 A1 | 10/2012 | Van Os et al. |
| 2012/0304084 A1 | 11/2012 | Kim et al. |
| 2012/0315972 A1 | 12/2012 | Olson et al. |
| 2013/0030645 A1* | 1/2013 | Divine .................... B60K 35/00 701/36 |
| 2013/0074008 A1 | 3/2013 | Umezawa et al. |
| 2013/0117698 A1 | 5/2013 | Park et al. |
| 2013/0147749 A1 | 6/2013 | Matthews et al. |
| 2013/0167088 A1 | 6/2013 | Mangum et al. |
| 2013/0187866 A1 | 7/2013 | Kim et al. |
| 2014/0006965 A1 | 1/2014 | Xu |
| 2014/0013254 A1 | 1/2014 | Hosein |
| 2014/0019910 A1 | 1/2014 | Kim et al. |
| 2014/0040826 A1 | 2/2014 | Wei et al. |
| 2014/0055388 A1 | 2/2014 | Yook et al. |
| 2014/0068477 A1 | 3/2014 | Roh |
| 2014/0068483 A1 | 3/2014 | Platzer et al. |
| 2014/0095073 A1 | 4/2014 | Matas et al. |
| 2014/0201126 A1* | 7/2014 | Zadeh .................... G06K 9/627 706/52 |
| 2015/0135328 A1* | 5/2015 | Ellis ........................ G06Q 10/10 726/26 |

\* cited by examiner

PRIVACY MANAGEMENT

CROSS-REFERENCE TO RELATED APPLICATIONS

This application claims the benefit of U.S. Provisional Patent application Ser. No. 62/043,111 entitled Privacy Management and filed on Aug. 28, 2014, the entirety of which is incorporated by reference herein.

BACKGROUND

Generally, when a driver has a passenger in a vehicle, certain information may become visible to the passenger of the vehicle, such as information displayed or rendered on a center console of the vehicle. As an example, a vehicle may be equipped with text to speech technology which enables the vehicle to narrate communications, such as text messages, aloud to the driver of the vehicle (e.g., or other users who have communicatively coupled their respective mobile devices with the vehicle). Examples of information which may be rendered or displayed may include text messages, caller identification (caller ID) information, applications, call logs or call history, navigation information or history, personal information, home address, bank account information (e.g., when a banking application is in use), etc. In some scenarios, this may not be desirable to the driver of the vehicle. For example, the driver of the vehicle may not want his or her information to be public or displayed in a public manner or in view of a passenger or other occupant of the vehicle, such as when sensitive information may be exposed (e.g., a bank account balance when utilizing a mobile banking application).

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

In one or more embodiments, a system for privacy management may change the way a human machine interface (HMI) interacts with a user, responds to a received communication (e.g., text message, telephone call, etc.), or renders an application based on a detected presence of one or more individuals, occupants, or passengers in a vehicle. In other words, privacy management may be provided by adjusting the way a system provides notifications, handles communications, or executes applications based on the presence or positioning of one or more occupants within a vehicle (e.g., different privacy modes may be enabled based on whether a passenger is sitting or occupying a front seat of a vehicle versus a back or rear seat of the vehicle).

For example, a vehicle may provide notifications in a first manner when merely a driver is present but the vehicle may provide notifications in a second manner (e.g., different than the first manner) when an additional occupant is detected. Here, in this example, a system for privacy management may control, mask, or hide information from additional occupants, such as by rendering sensitive information on different displays (e.g., a first display rather than a second display). Sensors may be utilized to detect the presence or positioning of occupants. Thus, communications or applications may be managed accordingly. In this manner, privacy management is provided, thereby enhancing security of applications or communications utilized by occupants of a vehicle, such as a driver, for example.

Additionally, in other embodiments, privacy may be provided to passengers or other occupants of a vehicle in a similar manner. For example, a first occupant or passenger may utilize a system for privacy management to manage one or more options of a privacy scheme. Here, the first occupant may setup one or more of the options to hide or mask information from a second occupant, such as another passenger of the vehicle, for example. If the first occupant is in the front passenger seat of the vehicle, one or more of the options may enable the first occupant to mask sensitive information (e.g., not render that information) in more visible locations, such as a center console display or other displays. Rather, a privacy component or management component may have the sensitive information rendered on a side display or generate a preview which may not include the sensitive information or by removing a private shortcut from view when additional occupants are present or detected within a vehicle, for example.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
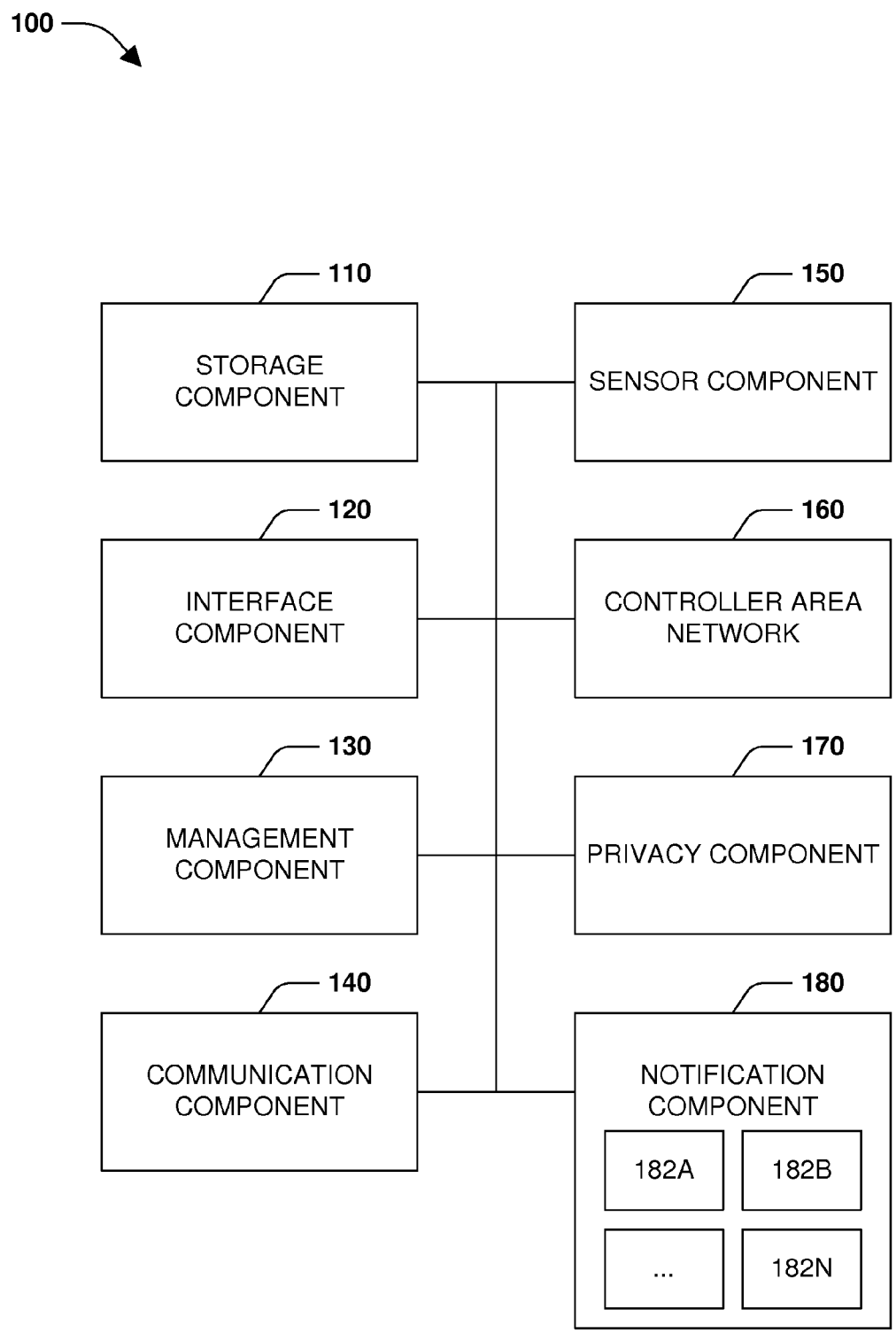
FIG. 1 is an illustration of an example component diagram of a system for privacy management, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 4:
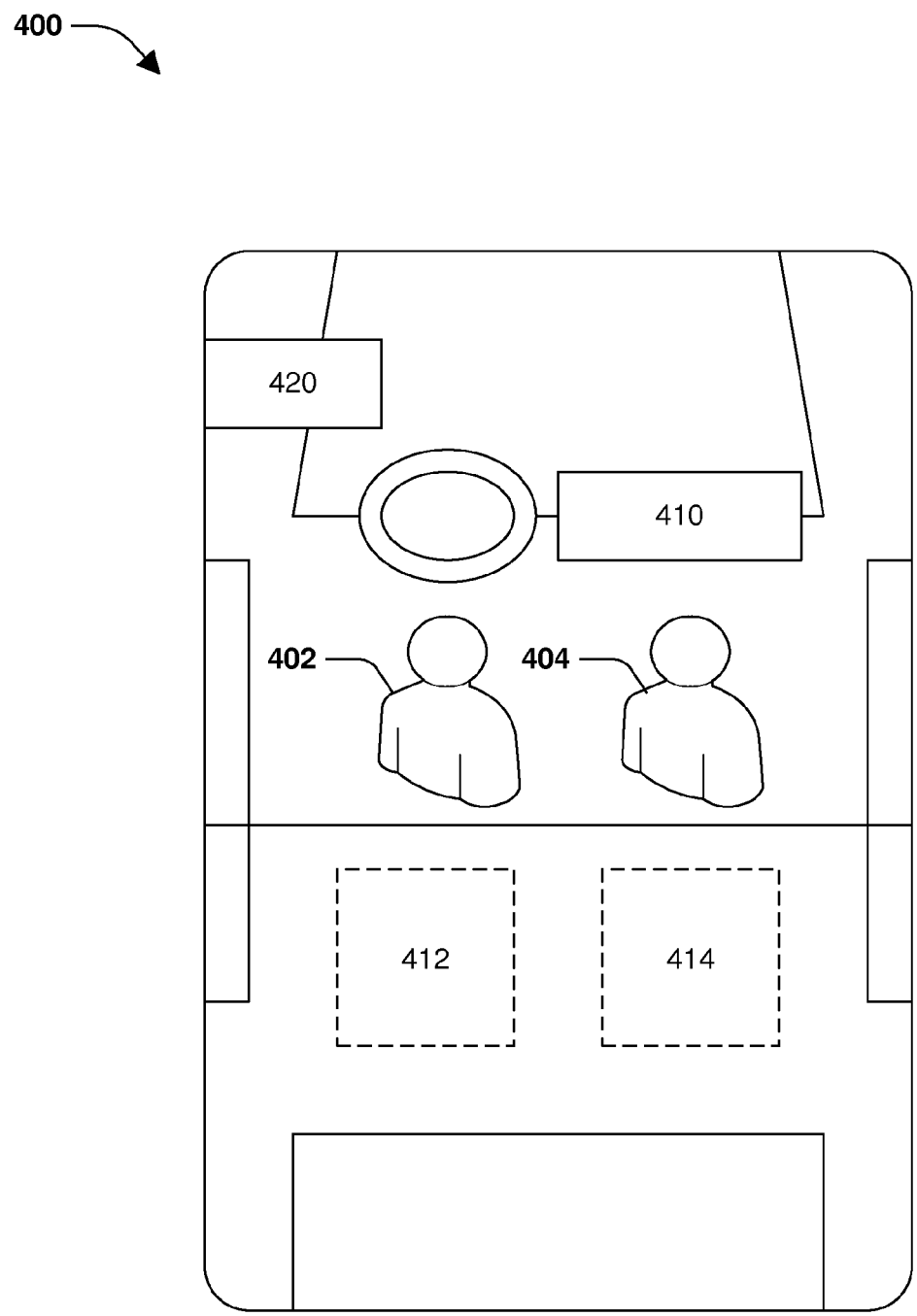
FIG. 4 is an illustration of an example implementation of a system for privacy management, according to one or more embodiments.

For one or more of the figures herein, one or more boundaries, such as boundary 412 of FIG. 4, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, the term "user" may include a driver of a vehicle, an operator of a vehicle, a passenger of a vehicle, an occupant of a vehicle, an individual, an entity, etc. As used herein, the term "content item" may include shortcuts, icons, tiles, media items, functional icons, shortcut icons, items, applications, 'apps', etc. Further, applications or 'apps' may be launched, executed, or run (e.g., via a processing unit or memory).

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example component diagram of a system 100 for privacy management, according to one or more embodiments. The system 100 for privacy management may include a storage component 110, an interface component 120, a management component 130, a communication component 140, a sensor component 150, a controller area network 160, a privacy component 170, and a notification component 180.

The storage component 110 may store one or more content items, one or more applications, one or more 'apps', or one or more shortcuts thereto. The interface component 120 may receive one or more user inputs from one or more users, which may include passengers, drivers, occupants, operators, etc. of a vehicle. For example, the interface component 120 may receive one or more user inputs indicative of one or more options, such as options of a privacy scheme for one or more applications. Here, one or more of the options may be associated with one or more applications.

The interface component 120 may enable a user, such as a driver or occupant, to interact with or provide input, such as user input, gestures, clicks, points, selections, etc. to a system 100 for privacy management. As an example, the interface component 120 may include a touch screen, a touchpad, a trackpad, one or more hardware buttons (e.g., on a radio or steering wheel), one or more software buttons, one or more soft buttons, one or more switches, a keypad, a microphone, one or more sensors, or other human-machine interface (HMI), etc. In one or more embodiments, the interface component 120 may be implemented in a manner which integrates a display component 182A or notification component 180 such that the interface component 120 both provides an output (e.g., renders content) and receives inputs (e.g., user inputs). An example of this may be a touch screen, for example.

Regardless, the interface component 120 may receive a variety of user inputs, such as verbal commands, spoken commands (e.g., utilizing a microphone or audio sensor), pressing of buttons, activating switches, gesture inputs, such as a swipe, a multi-finger swipes, a pinch and zoom, a touch (e.g., utilizing a touch screen), a press (e.g., via pressure sensors), a press and hold, a selection, a movement of a cursor, a click (e.g., utilizing a button, mouse button, a hardware buttons, a soft button, a software button, track button), etc. In this way, the interface component 120 may receive one or more user inputs, such as from a user, driver, passenger, or other occupant of a vehicle.

The management component 130 may enable the system 100 for privacy management or an operating system associated therewith to enter an edit mode. In edit mode, the management component 130 may enable a user to setup one or more home screens or one or more pages of home screens, such as within an operating system which may run or execute one or more applications associated with the storage component 110. As an example, the management component 130 may change a mode of operation of the system 100 for privacy management to an edit mode in response to an input or user input (e.g., predefined user input, customized user input, etc.) received by the interface component 120. In other words, the management component 130 may enable a user to enter edit mode when the user provides an input to the interface component 120.

As an example, when a user presses and holds a button on a touch pad (e.g., interface component 120) of a vehicle, the management component 130 may enter edit mode as a result of the press of the button. Here, the interface component 120 may pass or transmit one or more user inputs, such as the press and hold, along to the management component 130. In this example, the management component 130 may receive one or more user inputs (e.g., which may be received by the interface component 120).

Additionally, the management component 130 may exit an edit mode as a result of a user input (e.g., predefined user input, customized user input, etc.). For example, tapping a home button may cause the system 100 for privacy management to exit edit mode. When a user taps or presses a home button, such as a home button of an interface component 120 or a home button generated or provided by an interface component 120, the interface component 120 may transmit the tap of the home button (e.g., a user input) to the management component 130. The management component 130 may, after receiving this user input, change a mode of the system 100 to be in application mode or another mode, such as a mode for running applications, for example.

The management component 130 may manage one or more views of one or more applications, one or more home screens, one or more pages of one or more home screens, etc. Stated another way, the management component 130 may control user experience associated with consumption of one or more content items, one or more applications (e.g., stored on the storage component 110), media, 'apps', communications, telephone calls, text messages, infotainment, etc. The management component 130 may achieve this by generating one or more views of one or more content items, applications, home screens, pages of home screens, an operating system, etc.

For example, when a press of a home button is received by the interface component 120 or when a home button generated by the interface component 120 is activated, corresponding functionality may be enabled, initiated, executed, or run by the management component 130. Here, the management component 130 may generate a home screen view of an operating system or a view of a page of a home screen, which may include one or more shortcuts. In other words, the management component 130 may generate the home screen view in response or based on the press of the home button. Explained yet another way, when the home button is pressed, the management component 130 may cause a page of a home screen, such as the first page of the home screen to be rendered or navigate to the home screen as a result of the home button press.

In other aspects, the management component 130 may generate views of different pages of home screens, such as a first page of a home screen, a second page of a home screen, etc. Further, the management component 130 may generate views associated with different applications, such as applications which have been executed or initiated. For example, the management component 130 may generate a first view associated with a first application (e.g., in response to a first application being launched or a command to launch a first application), a second view associated with a second application (e.g., in response to a second application being launched or a command to launch a second application), etc. In this way, when different commands or user inputs are received (e.g., via the interface component 120), the management component 130 may generate one or more views or update views to be rendered accordingly.

As one example, when the home button is pressed or activated, the management component 130 may generate views of update views to be rendered (e.g., by a display component 182A or notification component 180), such as by cycling through different home screens or applications. When the home button is pressed a first time, the management component 130 may generate a view of a first page of a home screen. Continuing on, when the home button is pressed for a second time, the management component 130 may generate a view of a second page of a home screen or subsequent pages of a home screen, etc. In this way, the management component 130 may manage views of home screens or applications which are to be presented or rendered based on user input, such as user input received by the interface component 120.

The management component 130 may facilitate launching, execution, or running of one or more content items, such as applications or 'apps' stored on the storage component 110. For example, when a user provides the interface component 120 with a user input indicative of a command to launch an application (e.g., a selection gesture associated with an icon or shortcut corresponding to an application), the management component 130 may launch or execute the application accordingly. The management component 130 may thus launch or execute one or more applications in response to or based on one or more user inputs, such as user inputs indicative of a command to launch an application or user inputs received by the interface component 120. In this way, the management component 130 may facilitate operation of applications selected by a user, occupant, passenger, driver, entity, etc. within a vehicle.

The management component 130 may execute, launch, or run an operating system which utilizes one or more home screens associated with a grid layout of one or more icons or shortcuts. These shortcuts or icons may be linked to one or more applications, one or more content items, one or more communication functions (e.g., a texting application or a telephone application), utility applications, etc. The management component 130 may generate a view of the operating system, which may include a page of a home screen or a page from one or more home screens, a view of an application (e.g., associated with the application when launched), or other views associated with one or more content items (e.g., a slideshow of pictures or images), etc.

Further, the management component 130 may enable a user to configure or setup one or more home screens, one or more pages of one or more home screens, or one or more views or layouts associated therewith. For example, when the management component 130 enters the system 100 for privacy management into edit mode (e.g., in response to user input), the management component 130 may enable a user to arrange one or more icons, shortcuts, functional icons, shortcut items, etc. on a home screen or a page of a home screen. The user may thus utilize edit mode to configure or setup applications or content items according to their preferences, personal preferences, based on a predetermined sort order, alphabetically, chronologically based on last use of an application, chronologically based on installation date, based on frequency of use, etc.

The management component 130 may provide the edit mode such that users may add, delete, remove, modify, change the order of, sort, arrange, rearrange, prioritize, configure, edit, etc. one or more icons, one or more shortcuts, one or more home screens, one or more pages of one or more home screens, associated layouts or arrangements of shortcuts, etc. For example, a user may rearrange or change the order of one or more shortcuts to one or more applications by selecting (e.g., tapping on or inputting a tap gesture) an icon or shortcut and dragging that icon or shortcut to a new position within a grid on a home screen or a new (e.g., different) page of a home screen. In other words, the management component 130 may enable editing of shortcuts or icons using drag and drop gestures, among other types of user input.

In one or more embodiments, the management component 130 may enable a user to move icons or shortcuts across different displays or display components (e.g., 182A, 182B . . . 182N). For example, the management component 130 may provide a menu option for an icon or shortcut to be moved to a heads up display (HUD) of a vehicle. Here, in this example, a user could click or right click for the menu option and select the move to HUD command to move a shortcut or content item to a HUD. As another example, the management component 130 may provide a virtual HUD screen or interface which corresponding to the HUD. This HUD interface or virtual may be rendered or displayed on a display component which is not the HUD. For example, if a vehicle has a first display component 182A (e.g., a heads up display) and a second display component 182B (e.g., a center console display having touch screen functionality), the management component 130 may provide or generate the virtual HUD interface on the center console display. This enables the user to utilize the touch screen functionality of one display to configure or setup another display or display component which may not necessarily have similar functionality (e.g., touch screen capabilities). In this way, the management component 130 may generate an interface which enables a user to manipulate or organize shortcuts on a heads up display (HUD) utilizing the interface component 120 (e.g., the touch screen of the center console display), for example.

Further, the management component 130 may facilitate ease of configuration or setup by having icons or shortcuts which are not selected to be moved 'flow' around icons or shortcuts being moved or rearranged. In one or more embodiments, the management component 130 may provide one or more visual indicators of locations where icons or shortcuts may be dropped or placed, such as during a drag and drop operation while in edit mode. These visual indicators may be indicative of one or more potential positions or acceptable shortcut locations, thereby alerting a user as to where shortcuts or icons may be placed. As an example, if an icon or shortcut occupies a permanent position, is fixed, or is 'locked' with regard to editing or 'flow', the management component 130 may grey out that icon or area associated with that icon to alert a user that the 'locked' icon or shortcut may not be displaced (e.g., unless the icon or shortcut is 'unlocked', becomes non-permanent, etc.).

Regardless, the management component 130 may enable rearrangement of one or more icons, one or more shortcuts, etc. across multiple displays, vehicles, or display components (e.g., a first display component, a second display component, a heads up display, a center console display, a mobile device display, a cloud, etc.). As an example, the management component 130 may interface with the communication component 140 to transmit a layout of icons or shortcuts to a cloud or a server such that the layout may be applied other vehicles. In other words, if a driver configures a first vehicle having a first system 100 for privacy management with a layout of shortcuts, the communication component 140 of the first vehicle may transmit the layout to a cloud, server, or cloud server. When the driver operates a second vehicle, the communication component of the second vehicle may access or receive the layout which was configured utilizing the system 100 for privacy management of the first vehicle and have the management component of the second vehicle implement the layout for the second vehicle.

In one or more embodiments, the management component 130 may enable a user to manage privacy of one or more content items, one or more applications, or media consumed while one or more occupants are in a vehicle. For example, the management component 130 may provide one or more options, management options, or privacy options for one or more content items or applications. As discussed, examples of options may include adding, removing, or rearranging shortcuts to or from a display, display component, heads up display (HUD), center console display, etc. Additionally, other options may include privacy options which affect privacy, operation, rendering, presentation, or location of notifications or other content, for example. These options (e.g. options or commands provided by the management component 130) may be accessed from a control bar or interface, such as via a soft button, for example.

The management component 130 may enable a user, such as a driver, operator, or occupant of a vehicle, to mark or designate one or more icons, shortcuts, or content items as public, private, semi-private, semi-public, etc. Generally, icons marked as public may appear in a public view and a private view, while icons marked as private may merely appear in a private view. For example, as a result of an icon or shortcut being marked as private, that icon or shortcut may be hidden from view such that the icon or shortcut is not displayed on a center console display and moved to be displayed or rendered on a heads up display (HUD) instead of the center console display or not rendered when other occupants, such as passengers, are detected or present. Explained another way (e.g., with respect to views provided by a management component 130), when a management component 130 enters an edit mode, this enables a user to setup a home screen according to one or more views, such as a public view, a private view, etc. by marking or designating icons accordingly or in a corresponding fashion. Here, as an example, a user may select an icon or a shortcut and select one or more options or privacy options for that icon or shortcut. Examples of options or privacy options include marking a shortcut or icon as public, private, semi-public, semi-private, display options, such as displaying the shortcut or icon on a first display (e.g., a heads up display), a second display, both displays, neither display, editing options, such as removing the shortcut, positioning or rearranging shortcuts or icons, etc.

A semi-public or semi-private shortcut or icon may appear in a public view, a private view, both the public view and the private view, and may enable at least partial operation of an associated application. For example, an application designated as a semi-private application may have different functionality than an application designated as public or private. Here, in this example, the semi-private application may have a lower level of access or limited functionality. If a navigation application is marked as semi-private, the management component 130 may provide a user with access to general navigation functionality, but disable access to navigation history, favorite locations (e.g., home address, work address, etc.), search history, the ability to create bookmarks or favorites, etc. In other words, when an application or shortcut is designated as semi-private, functionality may be managed or controlled based on a presence of one or more occupants or additional occupants in a vehicle. In this way, the management component 130 may enable a user to setup presentation of home screens, shortcuts, etc. in an occupant based manner.

As an example, a banking application marked as private may be disabled from running when a privacy component 170 places the system 170 in privacy mode. The privacy component 170 may enable one or more features of the banking application when the system 100 is in semi-private or semi-public mode, such as by enabling transactions to occur, but disabling balance information from being shown or rendered, for example. In public mode, the banking application may function in typical fashion.

In one or more embodiments, the management component 130 may enable or disable one or more options based on functionality, availability, hardware capabilities, safety, etc. For example, while a vehicle is in drive, in gear, or in motion, the management component 130 may disable shifting of applications between display components, such as between a heads up display (HUD) and a center console display. As another example, the management component 130 may disable movement of a game application from a center console display to the heads up display of a vehicle (e.g., making the game application privately displayed on the HUD) due to safety concerns.

The management component 130 may provide a preview mode or an option which enables a user to enter a preview mode. The preview mode enables a user to view how icons, shortcuts, home screens, pages of home screens, etc. would appear according to one or more views, different views, such as a public view, a private view, a semi-public view, a semi-private view. In other words, the management component 130 may provide a view or generate a preview which simulates the presence of one or more occupants or one or more additional occupants within a vehicle and the resulting layout of icons, shortcuts, or presentation of notifications associated therewith.

In one or more embodiments, the management component 130 may generate a privacy scheme associated with one or more options for one or more applications. The management component 130 may generate the privacy scheme by aggregating one or more options or privacy options associated with one or more of the applications, such as whether an application is marked as private, semi-private, public, etc. In this way, the management component 130 may generate a privacy scheme associated with one or more options for one or more applications. As discussed, the privacy scheme may be indicative of a collection or aggregation of one or more of the options, such as how to handle (e.g., whether to provide audio notification, whether or not to provide notification, location of notification, etc.) notifications for an incoming phone call, text message, email, one or more applications, etc. when one or more passengers or occupants are detected (e.g., by a sensor component 150).

Further, the management component 130 may implement privacy schemes based on a positioning of an occupant or passenger. For example, the management component 130 may, in some embodiments, elect not to implement or apply a privacy scheme or enter privacy mode when occupants are in the rear of the vehicle. In other words, different versions of privacy schemes may be applied based on positioning of the passenger or occupant. Here, as an example, if an occupant is seated in the front passenger seat of the vehicle, a notification that a text message has arrived may be rendered on a heads up display, while contents of the text message may be rendered on the center console display when the passenger is seated in the rear of the vehicle and no presence is detected in the front passenger seat. In this way, the management component 130 may enable customization of privacy by generating a privacy scheme.

The communication component 140 may receive one or more communications, such as emails, messages, text messages, phone calls, telephone calls, voice communications, audio, media, video chat, etc. In one or more embodiments, the communication component 140 may receive one or more of the communications via a wireless channel, a telematics channel, a telecommunications channel, etc. The communication component 140 may facilitate synchronization of privacy schemes, options, layouts, applications, shortcuts, etc. across multiple vehicles for a driver. For example, the privacy component 170 may identify a driver of a vehicle (e.g., based on a key or key fob, login credentials, etc.) and transmit this scheme information or options to a cloud server, which may push this information to a second vehicle equipped with a system 100 for privacy management, thereby enabling privacy settings of a user to 'follow' him or her around.

The sensor component 150 may detect a presence of one or more occupants within a vehicle. The sensor component 150 may detect one or more of the occupants based on a wireless connection between the vehicle and a device of one or more of the occupants, a seat belt sensor, an image capture sensor, a weight sensor, or a door sensor. For example, a door sensor may infer that a passenger has gotten into a vehicle when tripped or activated. Other types of sensors may be utilized as well, such as Bluetooth, for example. Regardless, the sensor component 150 may detect the presence or position (e.g., weight sensor) associated with one or more occupants within a vehicle. As used herein, presence of an occupant, user, passenger, driver, etc. may include detecting a location or positioning of respective occupants.

The controller area network (CAN) 160 may receive presence information indicative of the presence of one or more of the occupants within the vehicle, such as from a sensor component 150 and pass or relay this information along to a privacy component 170 which may utilize the presence information to make determinations, such as a privacy mode determination or public mode determination. In other words, the CAN 160 may be utilized to facilitate communication between one or more components of the system 100 for privacy management.

The privacy component 170 may implement a privacy scheme based on a presence of one or more occupants within a vehicle, such as by implementing a privacy mode (e.g., rendering private views) or a public mode (e.g., rendering public views) of operation for the system 100 for privacy management. In other words, the privacy component 170 may select a mode of operation, such as by selecting a public mode, private mode, semi-private mode, semi-public mode, etc. As an example, when a shortcut is marked or designated as a private shortcut or a private application (e.g., by the management component 130), if a sensor component 150 detects that one or more occupants or one or more additional occupants are present in a vehicle, the privacy component 170 may select a private view to be rendered by one or more display components or for the system 100 to enter a privacy mode. In this example, the private view associated with privacy mode may have one or more shortcuts designated as private to be rendered by a first display component (e.g., 182A), such as a heads up display (HUD) and other shortcuts (e.g., not designated as private or otherwise designated as public) rendered by another display component (e.g., 182B) or a second display component, such as a center console display when a passenger or additional occupant is present or detected by the sensor component 150. In other embodiments, the private view (e.g., associated with a privacy mode) may forgo rendering of shortcuts designated as private when the passenger is detected or present. In this example, when a shortcut is marked as private, if a sensor component 150 detects that one or more passengers or one or more additional occupants are present in a vehicle, the privacy component 170 may have the system 100 enter a privacy mode to render a private view of a home screen which does not include the shortcut marked as private.

In one or more embodiments, the privacy component 170 may select a display component or a mode based on a presence of one or more occupants. For example, the privacy component 170 may select a public mode, a private mode, a semi-public mode, a semi-private mode, a level of access (e.g., first level of access, second level of access, public access, private access, semi-public access, semi-private access, etc.), a first display, a first display component, a second display, or a second display component based on the presence, location, or positioning of one or more occupants of a vehicle. The privacy component 170 may select a heads up display over a center console display to render a notification associated with a phone call when the phone call is received, for example. In other words, the privacy component 170 may implement a privacy scheme or one or more privacy options by selecting a display component.

Further, a display component (e.g., 182A, 182B, . . . 182N, etc.) may be selected based on a location of the display component within the vehicle, a visibility of the display component to a driver of the vehicle, a visibility of the display component to passengers of the vehicle, or a proximity or distance of the display component to the driver of the vehicle or another occupant of the vehicle. A selected display component 182A, 182B, etc. may render one or more applications, one or more content items, one or more shortcuts, or one or more home screens accordingly. For example, when a privacy component 170 engages the system 100 in a privacy mode and selects a first display component 182A, the first display component 182A may render one or more content items or applications designated or marked as private. In other words, a selected display may render applications, content items, shortcuts, home screens, etc. In some scenarios, other display components, such as a second display component 182B may render other content items or applications, such as those which are not designated as private or are designated as public, for example.

Regardless, the privacy component 170 may implement the privacy scheme by managing or adjusting how notifications are handled to a user, driver, or occupant of a vehicle. In one or more embodiments, this may be achieved by enabling or disabling a notification component 180 or one or more notification based on the presence of one or more occupants within a vehicle. The privacy component may manage displays, display components, modes, or levels of access based on one or more user preferences, a number of occupants in a vehicle, an identity of one or more of the occupants, etc.

The notification component 180 may include one or more display components (e.g., a first display component, a second display component, etc.), one or more audio components, etc. For example, 182A may be a heads up display (HUD), 182B may be a center console display or an instrument panel display, 182N may be an audio component, etc. The notification component 180 may render one or more notifications for one or more occupants of a vehicle. One or more of the display components (e.g., 182A, 182B, etc.) may render one or more icons, one or more shortcuts, one or more content items, one or more home screens, one or more pages of one or more home screens, one or more applications, etc.

Different examples of privacy schemes are described herein and may reference components, such as one or more components of the system 100 for privacy management of FIG. 1. For example, a sensor component 150 may detect a presence of one or more occupants of a vehicle (e.g., a driver, one or more passengers, one or more occupants, etc.). Here, the management component 130 may execute or be running one or more applications, such as a lane keeping assist system (LKAS) or adaptive cruise control (ACC), for example. When merely a driver is detected by the sensor component 150, the privacy component 170 may run one or more of these applications in a public mode, which enables notifications associated with the respective applications. In other words, the notification component 180 may provide one or more notifications for the driver in this scenario (e.g., where the driver is the only occupant in the vehicle). When the sensor component 150 detects one or more additional occupants in the vehicle, the privacy component 170 may switch operation to a privacy mode, which may result in the notification component 180 being disabled for the ACC or LKAS applications. The management component 130 may be utilized to enable or disable privacy mode or public mode as desired, however. In this way, the management component 130 or the privacy component 170 may enable or disable notifications from the notification component 180 such that notifications may or may not be generated depending on the presence of one or more occupants, passengers, or entities within a vehicle.

As another example, if a messenger application is running or launched by the management component 130 and the communication component 140 receives a text message, the notification component 180 may react differently depending on presence information sensed or detected by the sensor component 150. If merely a driver is detected within the vehicle (e.g., via the sensor component 150), the privacy component 170 may have the system 100 for privacy management operate in public mode. Accordingly, the notification component 180 may render the text message on a center console display and provide an audio text to speech rendering of the text message to the driver of the vehicle. However, if one or more passengers or other occupants are detected within the vehicle, the privacy component 170 may have the notification component 180 react differently by sending the system 100 into privacy mode. Here, when the vehicle or system 100 is in privacy mode, the notification component 180 may select a display component 182A which is a heads up display (HUD), located closer to the driver, or more in view of the driver, render a notification that a text message was received and await a response from the driver. In other words, when the sensor component 150 detects one or more passenger or additional occupants in the vehicle, the privacy component 170 may disable notifications associated with personal messages, such as text messages, email, etc. from appearing on the center console display. Further, the privacy component 170 may forward a notification to the HUD, which may prompt the driver whether or not to read the message aloud. In this way, the driver may be provided with an option whether or not to have the text message read aloud, for example.

In yet another example, the presence of passengers may be utilized to determine which display on which to render notifications, such as a notification for a telephone call. In this example, if passengers are detected by the sensor component 150, the privacy component 170 may have the notification component 180 or the system 100 operate in privacy mode or generate private views. Here, notifications, such as a notification for a telephone call, may be generated on the heads up display (HUD) rather than a center console display (e.g., which would be associated with public mode). Similarly, in privacy mode, information such as call history or recent calls may be masked, not rendered, or rendered on a display such as the HUD rather than the center console display.

In one or more embodiments, a user may utilize the interface component 120 to quickly move or shift applications from public view to private view or between a public mode to a privacy mode (e.g., on the fly). In other words, the management component 130 may enable a user to toggle between privacy mode and public mode, such as with the push of a button or other user input. For example, should a user prefer that one or more content items, applications, icons, or shortcuts appear on merely a first display component (e.g., a heads up display), rather than on a second display component (e.g., a center console display) or on both display components, the user may provide a user input to the interface component 120. Here, in this example, the management component 130 may enable the user to toggle the application to be rendered on the first display, the second display, both displays, neither display (e.g., not rendered at all), etc. The user may utilize a button on a steering wheel of a vehicle to move a current or currently running application between displays or toggle displays accordingly.

Similarly, the management component 130 may enable a user to toggle between public mode and privacy mode. As another example, if the user is utilizing a banking application, a button on the steering wheel (e.g., or other interface component 120) may toggle the banking application between a public mode (e.g., which may render additional information, such as bank account balance) and a privacy mode (e.g., which may merely render information regarding a current transaction).

In one or more embodiments, the privacy component 170 may enable or disable notifications, the notification component 180, enter public mode or privacy mode based on an identity of one or more of the occupants in the vehicle. The communication component 140 or other sensor components 150 may be utilized to determine an identity of one or more of the occupants of the vehicle. For example, if a husband and wife are seated in the vehicle with the wife in the driver's seat and the husband in the passenger seat, the sensor component 150 may detect a driver and a passenger in the front passenger seat. This presence information may be passed along the controller area network 160 to the privacy component 170.

Additionally, the identity of the driver and the identity of the passenger may be determined utilizing the sensor component 150 or the communication component 140. For example, the sensor component 150 may determine that the wife is present in the vehicle because her key fob is in the ignition. In other words, the sensor component 150 may determine the identity of an individual, occupant, or driver based on a key fob. The communication component 140 may sense or detect the husband or both the husband or wife because a mobile device for one or both of the occupants have mobile devices associated with a wireless connection to the vehicle, such as a Bluetooth connection. Stated another way, the communication component 140 may determine or infer (e.g., based on the presence of a mobile device) one or more identities of one or more occupants within the vehicle based on one or more mobile devices (e.g., or wireless connections associated therewith) for one or more of the occupants. In this way, the identity of one or more of the occupants may be ascertained. Further, the privacy component 170 may elect to remain in public mode or not enter privacy mode based on a relationship between a first occupant and a second occupant, such as the husband and wife of this example. In this way, the privacy component 170 may implement a privacy scheme based on one or more identities of one or more individuals or occupants within a vehicle. Accordingly, privacy may be provided in an intelligent manner.

In other embodiments, the system 100 for privacy management may work in reverse for passengers, such as passengers who wish to consume media or content items privately without sharing information with one or more other occupants, such as the driver or other passengers.

Figure 2:
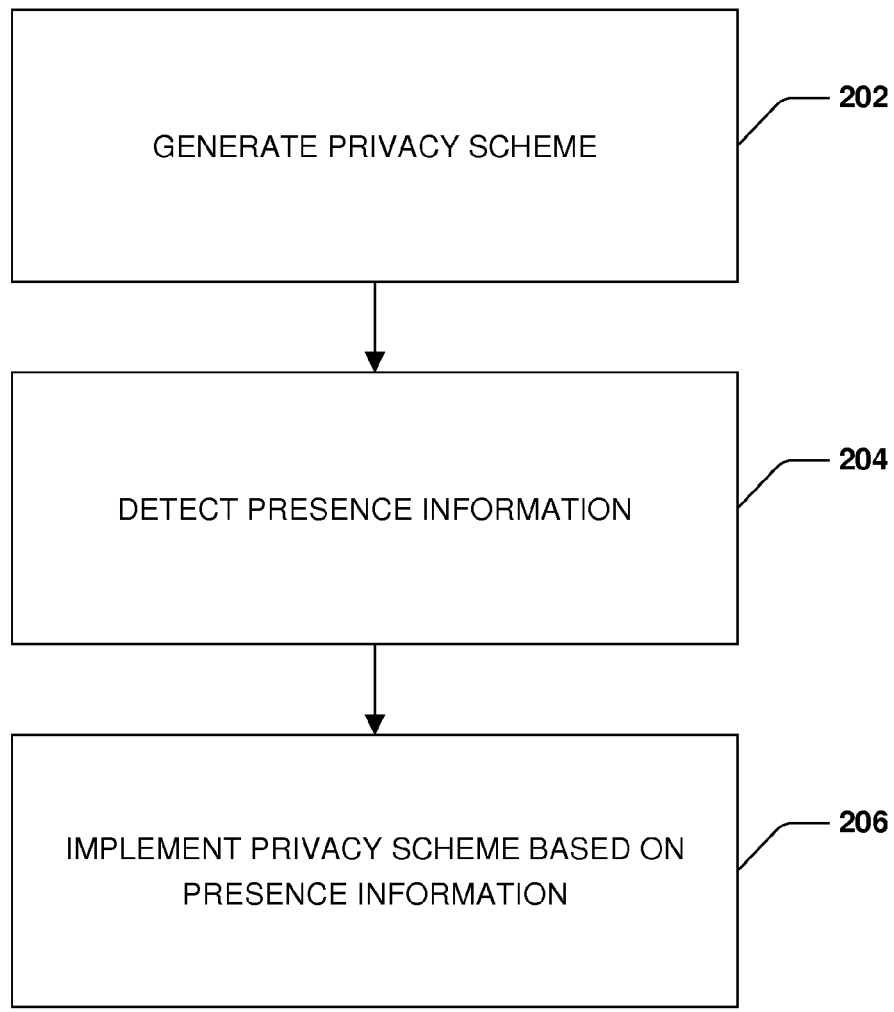
FIG. 2 is an illustration of an example flow diagram of a method for privacy management, according to one or more embodiments.

FIG. 2 is an illustration of an example flow diagram of a method 200 for privacy management, according to one or more embodiments. At 202, a privacy scheme may be generated. The privacy scheme may be associated with one or more options for one or more applications or one or more content items. At 204, presence information may be detected for one or more occupants of a vehicle. Presence information may include positioning of an occupant, such as front row, rear of vehicle, passenger side, driver side, etc. At 206, the privacy scheme may be implemented based on presence information of one or more occupants of a vehicle. A privacy scheme may be indicative of how notifications are handled when occupants or additional occupants are present within the vehicle and may be position dependent.

Figure 3:
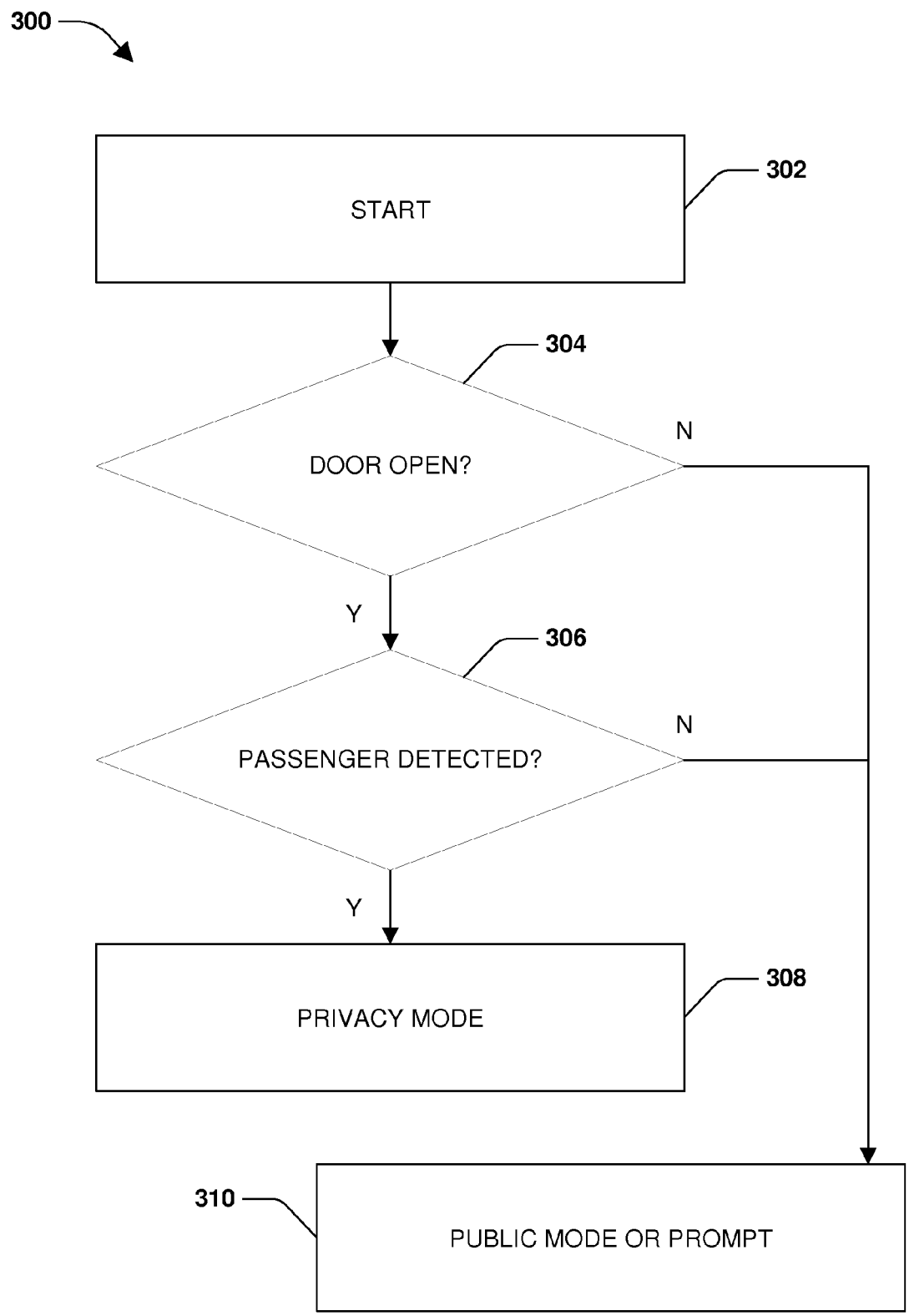
FIG. 3 is an illustration of an example flow diagram of a method for privacy management, according to one or more embodiments.

FIG. 3 is an illustration of an example flow diagram of a method 300 for privacy management, according to one or more embodiments. At 302, the method 300 begins. At 304, a determination is made as to whether a door has been opened. If no door has been opened, privacy is disabled such that no privacy scheme is applied or a system is placed in public mode at 310. In other embodiments, a prompt may be presented at 310 to determine whether private mode is desired. If no door has been opened (e.g., on the passenger side of the vehicle), it may be inferred that no passengers are present and the system may remain in public mode at 310. Conversely, if a door (e.g., passenger door) is opened at 304, it may be inferred that a passenger is present. Further, this may be confirmed at 306 (e.g., via a weight sensor or seat belt sensor, etc.). At 306, a determination is made as to whether a passenger or other occupant has been detected. As an example, whether or not a passenger is detected 306 may be based on whether the door was opened at 304. If the door was opened at 304 and a passenger is detected at 306, the system may enter privacy mode at 308. In privacy mode one or more private views may be presented or rendered. Functionality of applications may be masked, information may be hidden, or relocated to different display components in privacy mode.

FIG. 4 is an illustration of an example implementation 400 of a system for privacy management, according to one or more embodiments. FIG. 4 (among others) may be described with reference to one or more components of the system 100 for privacy management of FIG. 1. In FIG. 4, a first display 410 is a center console display. Generally, center console displays are viewable by most occupants within a vehicle, such as a driver 402 and a front passenger 404. In this example, seats 412 and 414 are not occupied, although other examples may include occupants at these respective positions. A second display 420 may be a heads up display (HUD) on the vehicle. As an example, if a system 100 for privacy management has a banking application designated as a private application, a privacy component 170 may have the system 100 enter privacy mode based on the presence of the front passenger 404, which may be detected by the sensor component 150. As an example, the management component 130 may render the banking application on the HUD display 420 rather than the center console display 410. As another example, the management component 130 may render partial banking information on the center console display 410, such as merely transaction related information (e.g., no bank account balance, etc.). In this way, privacy management is provided.

Figure 5:
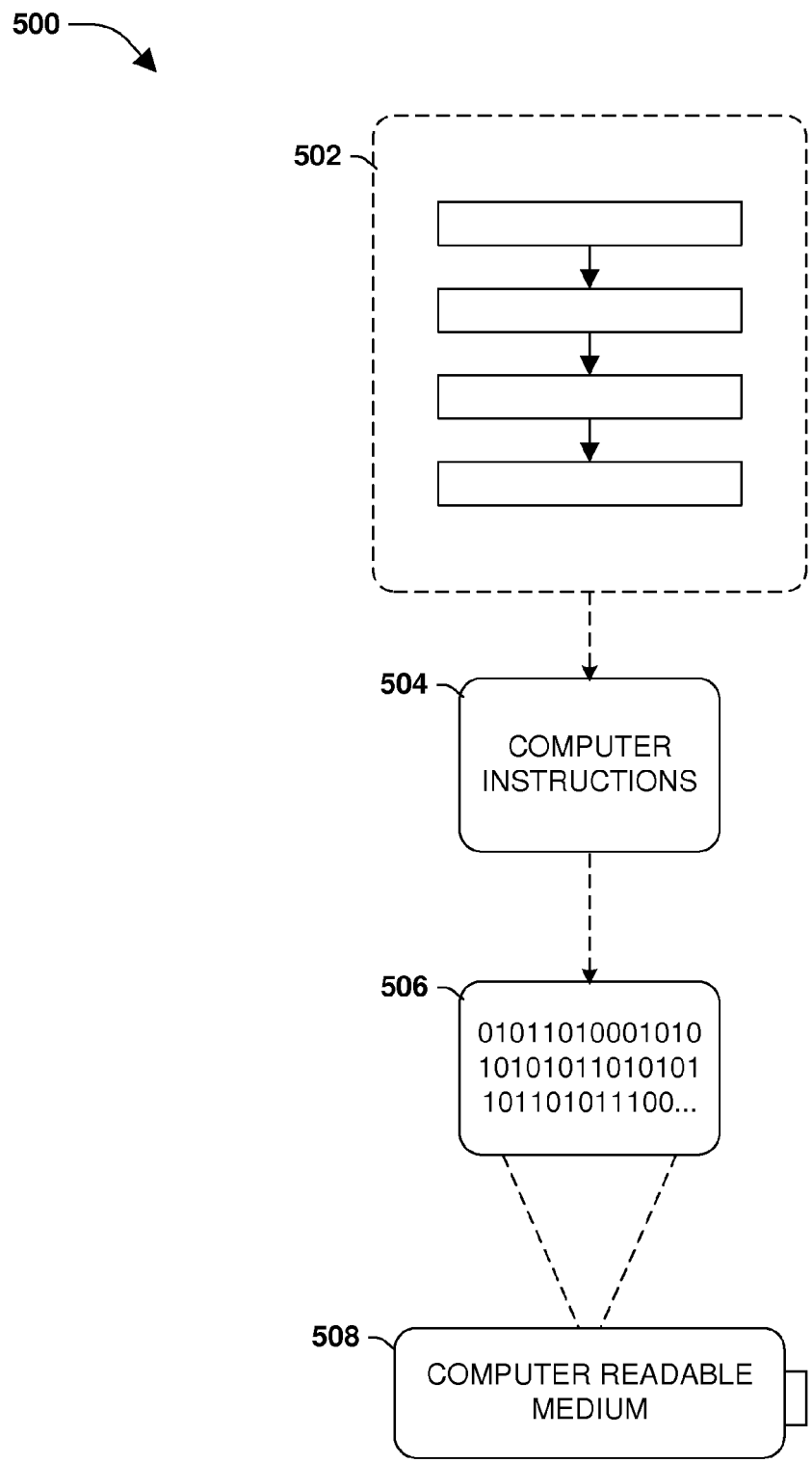
FIG. 5 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of computer instructions 504 configured to operate according to one or more of the principles set forth herein. In one such embodiment 500, the processor-executable computer instructions 504 may be configured to perform a method 502, such as the method 200 of FIG. 2 or the method 300 of FIG. 3. In another embodiment, the processor-executable instructions 504 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
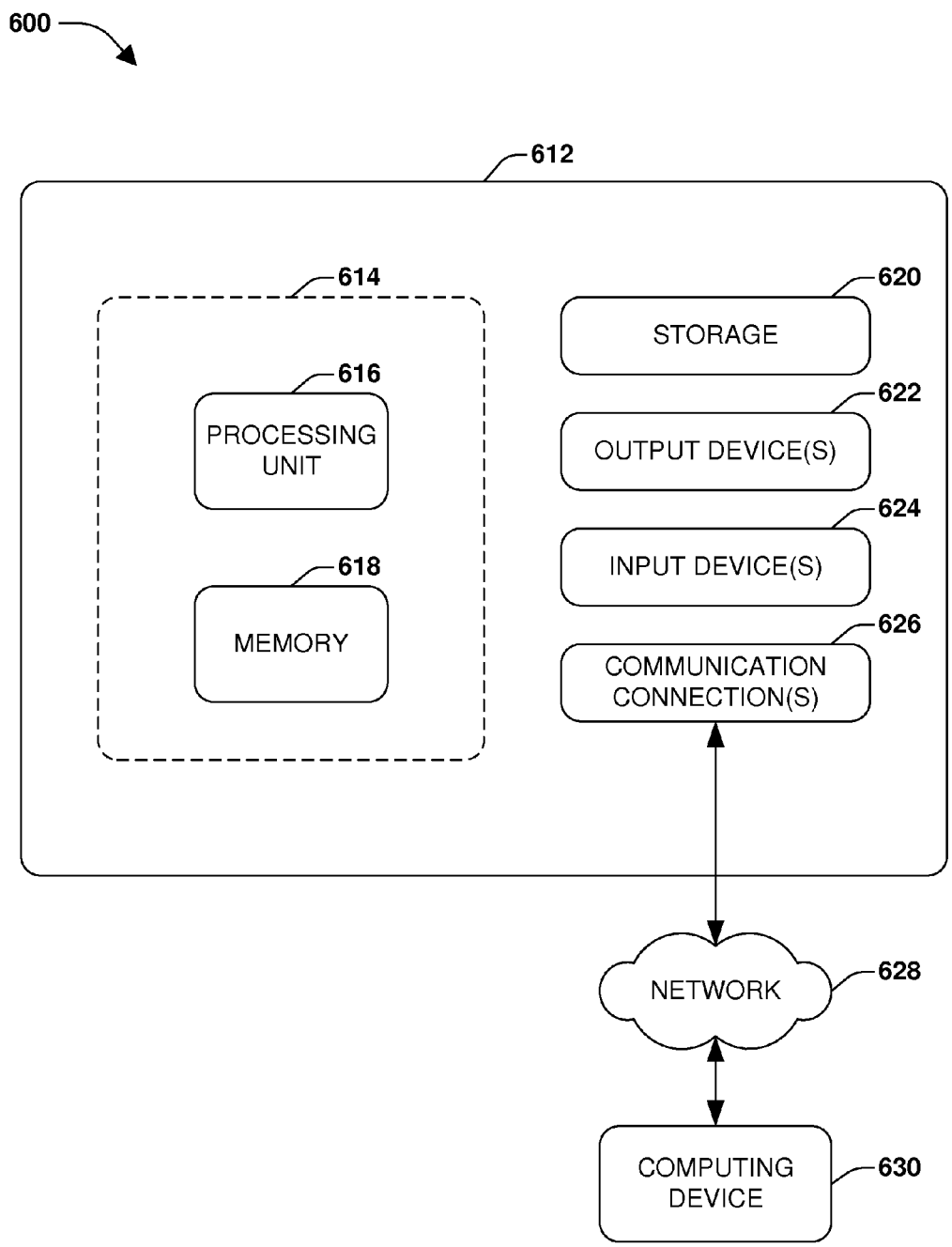
FIG. 6 is an illustration of an example computing environment where one or more of the provisions set forth herein are implemented, according to one or more embodiments.

FIG. 6 and the following discussion provide a description of a suitable computing environment to implement embodiments of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one or more embodiments provided herein. In one configuration, computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other embodiments, device 612 includes additional features or functionality. For example, device 612 may include additional storage such as removable storage or non-removable storage, including, but not limited to, magnetic storage, optical storage, etc. Such additional storage is illustrated in FIG. 6 by storage 620. In one or more embodiments, computer readable instructions to implement one or more embodiments provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 612. Any such computer storage media is part of device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 612 includes input device(s) 624 such as keyboard, mouse, pen, voice input device, touch input device, infrared cameras, video input devices, or any other input device. Output device(s) 622 such as one or more displays, speakers, printers, or any other output device may be included with device 612. Input device(s) 624 and output device(s) 622 may be connected to device 612 via a wired connection, wireless connection, or any combination thereof. In one or more embodiments, an input device or an output device from another computing device may be used as input device(s) 624 or output device(s) 622 for computing device 612. Device 612 may include communication connection(s) 626 to facilitate communications with one or more other devices.

According to one or more aspects, a system for privacy management is provided, including a management component, a sensor component, and a privacy component. The management component may generate a privacy scheme associated with one or more options for one or more applications. The sensor component may detect a presence of one or more occupants within a vehicle. The privacy component may implement the privacy scheme based on the presence of one or more of the occupants within the vehicle. The management component, the sensor component, or the privacy component may be implemented via a processing unit.

The system may include an interface component receiving one or more user inputs indicative of one or more of the privacy scheme options for one or more of the applications. The sensor component may detect one or more of the occupants based on a wireless connection between the vehicle and a device of one or more of the occupants, a seat belt sensor, an image capture sensor, a weight sensor, or a door sensor. The system may include a communication component receiving one or more emails, one or more text messages, one or more calls, or one or more communications. The privacy component may implement the privacy scheme by selecting a first display component or a second display component based on the presence of one or more of the occupants within the vehicle. The privacy component may implement the privacy scheme by enabling or disabling a notification component based on the presence of one or more of the occupants within the vehicle. The system may include a storage component storing one or more of the applications. The system may include a controller area network (CAN) receiving presence information indicative of the presence of one or more of the occupants within the vehicle. The system may include a notification component rendering one or more notifications for one or more occupants of the vehicle. The system may include a first display component and a second display component. The first display component may be a heads up display (HUD) and the second display component may be a center console display. The notification component may include one or more display components.

According to one or more aspects, a method for privacy management is provided, including generating a privacy scheme associated with one or more options for one or more applications, detecting a presence of one or more occupants within a vehicle, and implementing the privacy scheme based on the presence of one or more of the occupants within the vehicle. The generating, the detecting, or the implementing may be implemented via a processing unit.

The method may include receiving one or more user inputs indicative of one or more of the privacy scheme options for one or more of the applications. Detecting one or more of the occupants may be based on a wireless connection between the vehicle and a device of one or more of the occupants, a seat belt sensor, an image capture sensor, a weight sensor, or a door sensor. Implementing the privacy scheme may include selecting a first display or a second display based on a presence of one or more of the occupants within the vehicle. Implementing the privacy scheme may include enabling or disabling one or more notifications based on the presence of one or more of the occupants within the vehicle. The privacy scheme may be implemented based on a number of occupants within the vehicle.

According to one or more aspects, a system for privacy management is provided, including a management component, a sensor component, and a privacy component. The management component may generate a privacy scheme associated with one or more options for one or more applications based on one or more user inputs. The sensor component may detect a presence of one or more occupants within a vehicle. The privacy component may implement the privacy scheme based on the presence of one or more of the occupants within the vehicle. The management component, the sensor component, or the privacy component may be implemented via a processing unit.

The system may include an interface component receiving one or more of the user inputs indicative of one or more of the privacy scheme options for one or more of the applications. The sensor component may detect one or more of the occupants based on a wireless connection between the vehicle and a device of one or more of the occupants, a seat belt sensor, an image capture sensor, a weight sensor, or a door sensor. The privacy component may implement the privacy scheme by selecting a first display component or a second display component based on the presence of one or more of the occupants within the vehicle. A selected display component may render one or more applications, one or more content items, or one or more home screens.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for privacy management, comprising:
    an interface component receiving one or more user inputs indicative of one or more privacy scheme options for one or more applications;
    a management component generating a privacy scheme by aggregating one or more of the privacy scheme options for one or more of the applications;
    a sensor component detecting a presence and a position of one or more other occupants within a vehicle based on a wireless connection between a device of one or more of the other occupants and the vehicle; and
    a privacy component selecting a mode of operation of the system from a private mode, a semi-private mode, a public mode, and a semi-public mode based on the presence and the position of one or more of the other occupants within the vehicle, the privacy component implementing the privacy scheme by selecting a heads up display (HUD) component or a center console display component of the vehicle based on the privacy scheme and the mode of operation of the system, and
    a notification component rendering a view associated with one or more of the applications to the selected display component based on the privacy scheme and the mode of operation, wherein a shortcut associated with a private application is rendered or not rendered based on the presence and the position of one or more of the other occupants within the vehicle relative to the selected display component and the mode of operation, wherein the interface component, the management component, the sensor component, the privacy component, or the notification component is implemented via a processing unit.

2. The system for privacy management of claim 1, wherein the sensor component detects one or more of the occupants based on a seat belt sensor, an image capture sensor, a weight sensor, or a door sensor.

3. The system for privacy management of claim 1, comprising a communication component receiving one or more emails, one or more text messages, one or more calls, or one or more communications.

4. The system for privacy management of claim 1, wherein the privacy component implements the privacy scheme by selecting a first display component or a second display component based on the presence of one or more of the occupants within the vehicle.

5. The system for privacy management of claim 1, wherein the privacy component implements the privacy scheme by enabling or disabling the notification component based on the presence of one or more of the occupants within the vehicle.

6. The system for privacy management of claim 1, comprising a storage component storing one or more of the applications.

7. The system for privacy management of claim 1, comprising a controller area network (CAN) receiving presence information indicative of the presence of one or more of the occupants within the vehicle.

8. The system for privacy management of claim 1, the notification component rendering one or more notifications for one or more of the occupants of the vehicle.

9. A method for privacy management, comprising:
receiving, at an interface component, one or more user inputs indicative of one or more privacy scheme options for one or more applications, wherein one or more of the applications are stored at a storage component;
generating, using a management component, a privacy scheme associated with one or more of the privacy scheme options for one or more of the applications;
detecting, using a sensor component, a presence and a position of one or more other occupants within a vehicle based on a wireless connection between a device of one or more of the other occupants and the vehicle;
selecting, using a privacy component, a mode of operation of the vehicle from a private mode, a semi-private mode, a public mode, and a semi-public mode based on the presence and the position of one or more of the other occupants; and
implementing, using the privacy component, the privacy scheme by rendering content associated with one or more of the applications to a display component in the vehicle based on the mode of operation, one or more of the privacy scheme options for one or more of the applications, and the position of one or more of the other occupants within the vehicle,
wherein a shortcut associated with a private application is rendered or not rendered based on the presence and the position of one or more of the other occupants within the vehicle relative to the display component and the mode of operation, wherein the interface component, the management component, the sensor component, or the privacy component is implemented via a processing unit.

10. The method for privacy management of claim 9, wherein detecting one or more of the occupants is based on a seat belt sensor, an image capture sensor, a weight sensor, or a door sensor.

11. The method for privacy management of claim 9, wherein implementing the privacy scheme comprises selecting a heads up display (HUD) or a center console display of the vehicle based on the presence of one or more of the occupants within the vehicle.

12. The method for privacy management of claim 9, wherein implementing the privacy scheme comprises enabling or disabling one or more notifications based on the presence of one or more of the occupants within the vehicle.

13. The method for privacy management of claim 9, wherein the privacy scheme is implemented based on a number of occupants within the vehicle.

14. A system for privacy management, comprising:
an interface component receiving one or more of user inputs indicative of one or more of privacy scheme options for one or more applications, wherein one or more of the privacy scheme options include private, semi-private, public, and semi-public privacy scheme options;
a management component generating a privacy scheme associated with one or more of the privacy scheme options for one or more of the applications based on one or more of the user inputs;
a sensor component detecting a presence of one or more other occupants within a vehicle based on a wireless connection between a device of one or more of the other occupants and the vehicle; and
a privacy component selecting a mode of operation of the system from a private mode, a semi-private mode, a public mode, and a semi-public mode based on the presence of one or more of the other occupants within the vehicle, the privacy component implementing the privacy scheme by selecting a heads up display (HUD) component or a center console display component of the vehicle based on the presence of one or more of the other occupants within the vehicle, wherein the selected display component renders one or more applications, one or more content items, or one or more home screens, based on the privacy scheme and the mode of operation,
wherein the selected display component renders or does not render a shortcut associated with a private application based on the presence of one or more of the other occupants within the vehicle relative to the selected display component and the mode of operation,
wherein the interface component, the management component, the sensor component, or the privacy component is implemented via a processing unit.

15. The system for privacy management of claim 14, wherein the sensor component detects one or more of the occupants based on a seat belt sensor, an image capture sensor, a weight sensor, or a door sensor.

16. The system for privacy management of claim 1, wherein one or more of the privacy scheme options include private, semi-private, public, and semi-public privacy scheme options.

17. The system for privacy management of claim 1, wherein selecting the display component is further based on a visibility of the display component to a driver of the vehicle and a visibility of the display component to one or more of the other occupants of the vehicle.

18. The system for privacy management of claim 1, further including receiving, at the interface component, one or more user inputs indicative of a change in the mode of operation of the system and modifying the mode of operation based on one or more of the user inputs.

19. The system for privacy management of claim 14, wherein selecting the HUD component or the center console display component is based on a proximity of the HUD component to a driver of the vehicle and one or more of the other occupants of the vehicle, and a proximity of the center console display component to the driver of the vehicle and one or more of the other occupants of the vehicle.

\* \* \* \* \*